United States Patent
Kreis et al.

[11] Patent Number: 5,393,095
[45] Date of Patent: Feb. 28, 1995

[54] APPARATUS AND METHOD FOR REPLACEMENT OF A BEARER MEMBER OF A LONGITUDINAL BEARER JOINT IN A MOTOR VEHICLE BODY

[75] Inventors: Gundolf Kreis, Oberstimm; Heinrich Timm, Ingolstadt; Viorel Bora, Heilbronn, all of Germany

[73] Assignee: Audi AG, Ingolstadt, Germany

[21] Appl. No.: 78,198

[22] PCT Filed: Nov. 8, 1991

[86] PCT No.: PCT/EP91/02114

§ 371 Date: Jun. 17, 1993

§ 102(e) Date: Jun. 17, 1993

[87] PCT Pub. No.: WO92/11160

PCT Pub. Date: Jul. 9, 1992

[30] Foreign Application Priority Data

Dec. 20, 1990 [DE] Germany .................. 4041039.0

[51] Int. Cl.⁶ .................................................. B62D 21/00
[52] U.S. Cl. ...................................... 280/781; 280/785; 280/798
[58] Field of Search ................... 280/785, 798, 781

[56] References Cited

U.S. PATENT DOCUMENTS

| 1,629,301 | 5/1927 | Pfander | 280/798 |
| 4,618,163 | 10/1986 | Hasler et al. | 280/785 |

FOREIGN PATENT DOCUMENTS 0097222 1/1984 European Pat. Off. .
0146716 12/1988 European Pat. Off. .
1329656 5/1963 France .
554980 6/1932 Germany .
3740402 6/1988 Germany .
448527 6/1936 United Kingdom .

*Primary Examiner*—Kenneth R. Rice
*Attorney, Agent, or Firm*—Thomas C. Feix; Jacques M. Dulin

[57] ABSTRACT

A bearer joint for a vehicle bodywork, and in particular a longitudinal front bearer joint, and a method for placing a aluminum bearer member on the bearer joint in the vehicle bodywork. The bearer joint comprises a cast aluminum connector for joining together a first forward bearer member and a second rearward bearer member. The connector includes a tubular aluminum recess or socket for receiving the rearward end of the first aluminum bearer member which is fixed thereto by a transverse weld seam at the front receiving edge of the socket. A plurality of offset thickened regions with through holes are provided to the periphery of the socket. To replace a damaged front bearer member, the weld is cut and the damaged front bearer is withdrawn from the socket. A repair kit is provided which includes a replacement front bearer member and a platelike insert sized to fit within an end of the replacement bearer member. The bearer member and insert are provided with offset holes which correspond in number and location to the holes provided to the socket. Threaded screw and/or bolt fasteners are used to secure the insert and replacement bearer member within the socket.

11 Claims, 2 Drawing Sheets

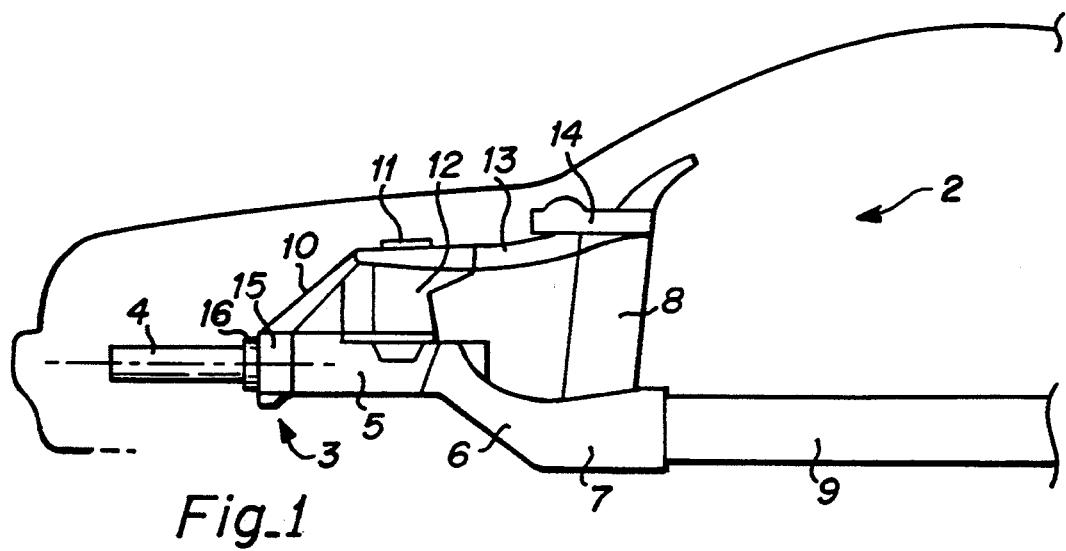
Fig_1
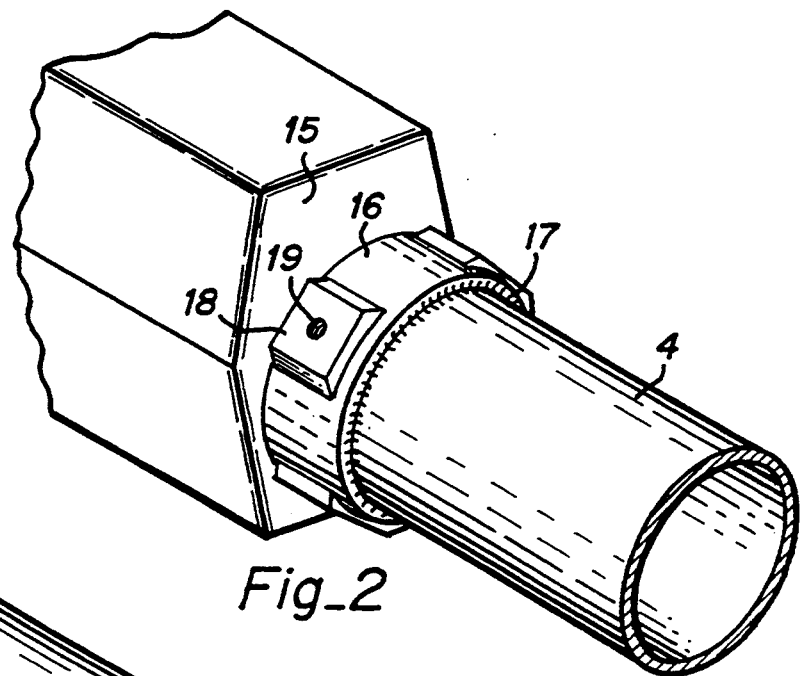
Fig_2
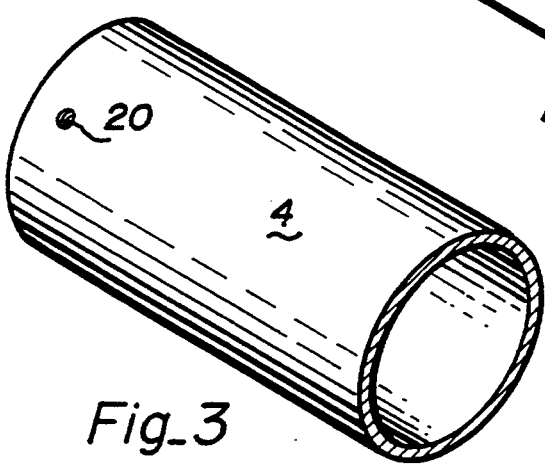
Fig_3
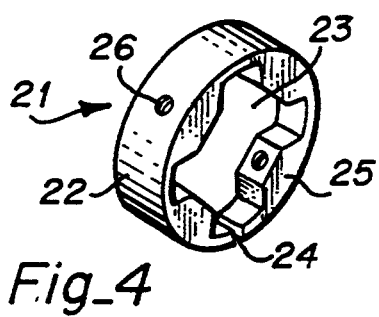
Fig_4

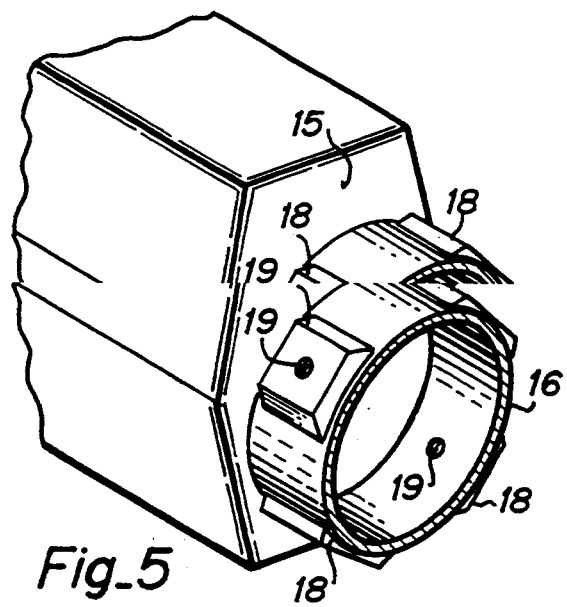
Fig_5
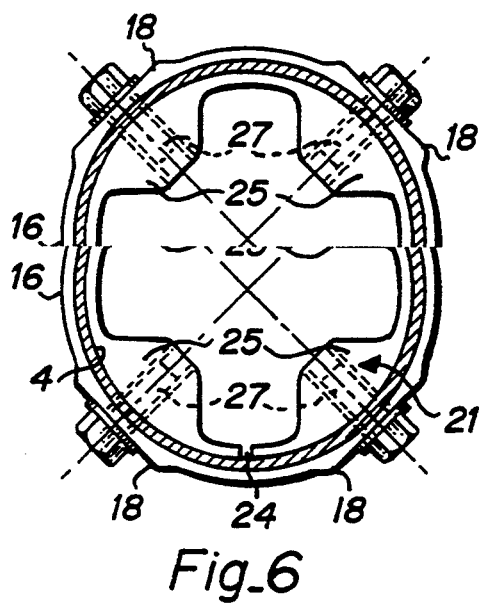
Fig_6
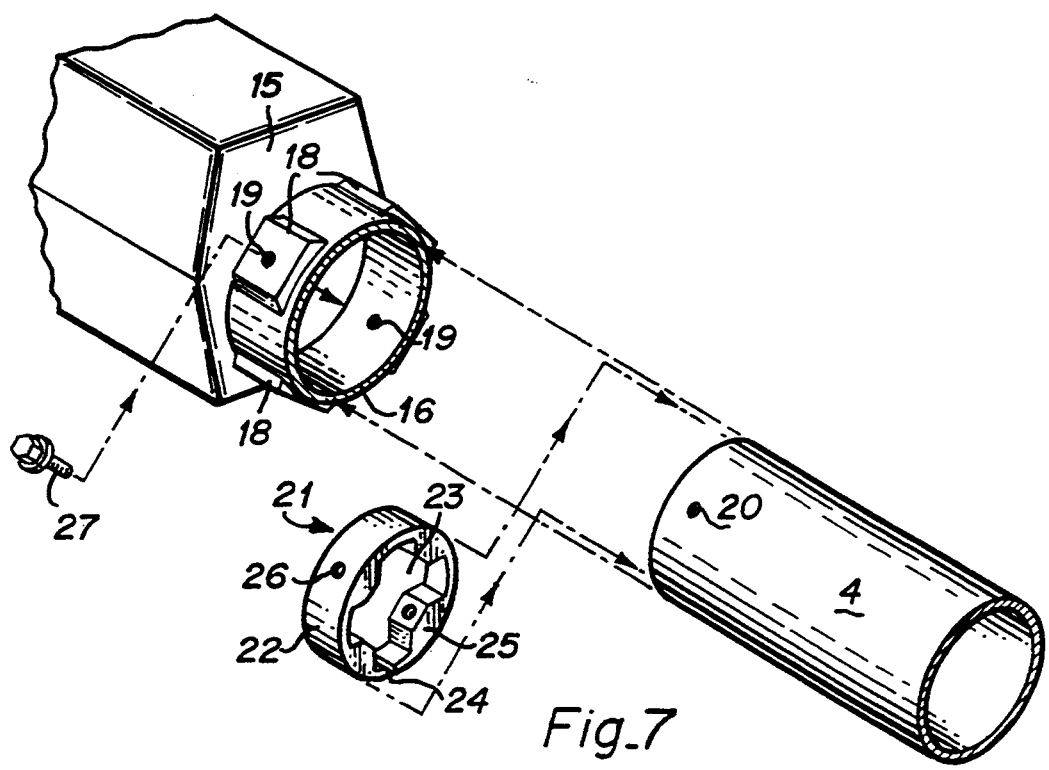
Fig_7

APPARATUS AND METHOD FOR REPLACEMENT OF A BEARER MEMBER OF A LONGITUDINAL BEARER JOINT IN A MOTOR VEHICLE BODY

FIELD

The present invention relates generally to fabrication and repair techniques for a motor vehicle bodywork. More particularly, the invention relates to an apparatus and method for replacement of an aluminum bearer member in a longitudinal bearer joint in a vehicle bodywork.

BACKGROUND

From published European Patent document EP-PS 146 716, it is known how to produce the load-bearing structure of a vehicle bodywork by using nodal connector elements for joining together hollow section bearers. Extruded aluminum sections are used as the hollow section bearers and cast aluminum joint pieces are used as the nodal connector elements. Such a bodywork design offers improved corrosion resistance and weight savings.

It is also known from the prior art how to construct a hollow-section longitudinal bearer assembly of a vehicle frame from a plurality of longitudinal bearer members. These individual longitudinal bearer members are joined together, in end to end fashion, by a surrounding weld seam beginning with the forward most bearer member and working rearwards. Each successive longitudinal bearer member beginning with the forwardmost bearer member is dimensioned with a progressingly greater wall thickness and/or is made of a progressively higher grade of material than its preceding bearer member such that the resulting longitudinal bearer assembly has a graduated stiffness or resistance to deformation which increases toward the middle of the vehicle. Thus, in the event of a minor accident, usually only one or two of the forwardmost bearer members will experience deformation without damage to the adjacent rearwardly disposed bearer members. This arrangement greatly simplifies the repair of the vehicle front and also avoids an undesirable total deformation of the vehicle frame in less severe accidents.

In the vehicle frame of the type described, the repair of a deformed longitudinal bearer assembly is accomplished by cutting out the damaged bearer members and welding on new bearer members. For the case where the longitudinal bearer assembly comprises sheet metal stampings, the described repair procedure does not give rise to any major structural problems since the original strength of sheet metal is substantially retained even after welding.

European Patent document 0146 716 discloses a positive-locking connection scheme in a longitudinal bearer assembly in a vehicle body wherein an aluminum bearer, formed as an extruded section, is inserted into a tubular aluminum recess or socket formed as a cast piece. The aluminum bearer is then welded to the front edge of this tubular recess by a surrounding weld seam. Such a connection is stable and economical.

However, it is well known that the thermal welding of heat treatable aluminum alloys produces a significant decrease in the strength in the material in the so-called "zone of thermal influence" immediately adjacent the weld seam. A surrounding weld connection, such as is used in the above-described bearer joint, is especially critical, since it produces a weakening in a continuous transverse plane. The decrease in the strength of the bearer joint caused by the welding procedure during the initial assembly can be factored into the dimensions of the component parts. However, in view of the repeat welding procedure required each time a damaged bearer is cut out and replaced by a new bearer, an uncontrollable amount of damage to the grain texture of the tubular recess of the connector results. This gives rise to a large decrease in the original strength of the material in the heat affected zone and a danger of fracture of the bearer joint during heavy load conditions.

This is particularly problematic in the situation where the bearer member is part of a segmented longitudinal bearer assembly, since in this situation, it is taken for granted that the less stiff and more easily deformable forward bearer members of the longitudinal bearer assembly will necessarily be replaced during repairs after an accident. Further, the forward bearer members may even need to be replaced one or more times for normal wear or fatigue during the lifetime of the vehicle. The welding procedures repeatedly required in this case would unacceptably weaken the joint by progressive structural change in the zone of thermal influence of the material of the aluminum alloy.

While it is conceivable to incorporate an acceptable safety factor into the initial design of the bearer joint such that the wall thicknesses of the component parts are sufficiently large to compensate for the aforesaid severe decrease in strength caused by successive welding procedures, this is not a practical solution in view of the additional cost and weight involved. Furthermore, it is desirable to provide the customer with a vehicle body which retains its original strength even after repairs.

German patent document DE 3 740 402 discloses another design for a front longitudinal bearer assembly which comprises two longitudinal bearer members disposed forwardly of the front suspension mounting.

Here too, the forwardmost longitudinal bearer member is designed as a deformation element such that in the event of a minor collision, it will deform more easily than the adjacent rearwardly disposed longitudinal bearer member. The longitudinal bearer members are arranged in succession and are connected together at abutting ends or bearing surfaces. The abutting bearing surfaces are designed as rotational surfaces in the transverse direction. A central, axially aligned bolt connection is used to join the abutting bearing surfaces of the two longitudinal-member portions.

This configuration is especially advantageous when the longitudinal bearer members are formed as extruded aluminum sections, since the easily accessible bolt connection permits quick and simple replacement of a deformed forward longitudinal bearer member after a minor collision. Also, the strength loss problems associated with the replacement of aluminum welds is not present here. However, the cost of the bolt connections used in this design are relatively high.

THE INVENTION

OBJECTS

It is therefore a primary object of the invention to provide an improved aluminum longitudinal bearer assembly in a vehicle frame of the type having a graduated stiffness characteristic which increases towards the middle of the vehicle wherein a bearer joint is formed by the fitted insertion and welded connection of a first, forwardly disposed and easily deformable hollow section bearer member within a cast aluminum receiving socket of a connector, and wherein the first bearer member can be easily and inexpensively replaced without compromising the original strength of the bearer joint.

It is another object of the invention to provide a repair kit which includes a replacement front bearer member and a specially adapted fitted insert for replacement of a damaged front bearer member and which, in combination, provide a sturdy, reinforced connection to the receiving socket of the bearer joint.

It is another object of the present invention to provide a method for replacement of a deformed front bearer member in a aluminum longitudinal bearer assembly of the type herein described which is low cost and easy to implement in existing vehicle body designs assembled from extruded aluminum frame components.

Other and further objects will become evident from the following written description, drawings and claims appended hereto.

DRAWINGS

FIG. 1 is a partial schematic view in side elevation of the front region of a vehicle showing the front bearer structure of a vehicle body with a two-part front longitudinal bearer assembly.

FIG. 2 is an enlarged isometric view of the improved longitudinal bearer joint of the present invention showing a first cylindrical longitudinal bearer member fitted within a receiving socket.

FIGS. 3-5 show the requisite repair kit components for the reinforced replacement of a deformed bearer member of a longitudinal bearer joint wherein:

FIG. 3 is an isometric view of a replacement front longitudinal bearer member;

FIG. 4 is an isometric view of an insert having means for receiving a screw or bolt fasteners; and FIG. 5 is an isometric view of the receiving socket shown after the original transverse weld seam which connects the front longitudinal bearer member to the socket has been cut out and the original bearer member (not shown) removed.

FIG. 6 is a partial cross section view in the axial direction of a longitudinal bearer joint after a repair has been completed showing the insert fitted within the hollow interior of the replacement bearer which, in turn, has been fitted within the socket and bolted in place.

FIG. 7 is an exploded isometric view of the socket, insert and replacement bearer member.

SUMMARY

The invention comprises a method and apparatus for the replacement of a damaged aluminum bearer member in a longitudinal bearer joint of a motor vehicle bodywork comprised of aluminum frame members and cast aluminum connecting elements. According to a preferred embodiment of the invention, the front bearer joint comprises a cast aluminum connector for joining a first, forwardly disposed extruded aluminum bearer member to a second, rearwardly disposed aluminum bearer member. The connector includes a first tubular recess or socket for receiving the rearward end of the first, front bearer member. After insertion within the socket, the bearer member is fixed thereto by a surrounding transverse weld seam provided to the forward edge of the socket.

Such a longitudinal bearer joint is produced during initial assembly. To replace a front bearer member which has become deformed as a result of a minor collision, it is not safe to repair the joint by simply separating the weld seam, inserting a new bearer member and reweld the component parts, since a repair in this manner would result in an undesirable decrease in the original strength of the aluminum material in the heataffected zones.

According to the invention, a longitudinal bearer member joint is therefore proposed wherein the socket end of the cast aluminum connector is provided with a plurality of reinforced holes spaced apart along its perimeter edge. Also provided is a repair kit which includes a replacement bearer member and an insert piece in the form of a nut plate. In use, the insert is fitted within the hollow interior of the replacement bearer member, which is then fitted within the socket. The insert and replacement bearer are also provided with holes which are spaced for alignment with the threaded holes of the socket. The three components are then secured together by screw or bolt fasteners. The holes of the insert are preferably threaded.

The initial assembly of such a member joint can be carried out rapidly and economically by the manufacturer by means of a weld. In repair workshops, however, the special equipment required for a suitable replacement weld is not always available. Also, repair personnel do not always have the special expertise and/or training required for ensuring a strong weld of the aluminum components. This is particularly a concern when the welded joints are located at the critical points of an aluminum longitudinal-member joint which are subject to very high load conditions.

In addition, substantial preparation work and precautions must be taken into consideration for fusion welding operations in the area of the engine compartment. For example, as it is necessary to provide enough room for the welding torch, removal of auxiliary units and/or the engine itself may be required. Also, great care must be taken during the welding procedure in order to prevent against accidental fire and explosion which may be caused by the welding torch. This prep work is entirely eliminated in the case where the fitted insert and screwed joint repair method of the present invention is used, thus giving rise to significant time and cost savings.

Also, unlike the typical repair by welding, the fitted insert and screwed joint repair method of the present invention can be easily performed by any workshop upon delivery of an appropriate repair kit. Further still, the problem of an impermissible reduction in material strength due to repeated welding operations does not occur, since welding is performed only once on the socket (i.e., during initial assembly by the manufacturer) and this measure may be taken into account when dimensioning the component parts.

According to the invention, it is preferable to design the replacement bearer member as an elongated cylindrical member and the socket as a circular ring. However, other cross-sectional configurations of the sections are possible and these cross-sectional configurations are easily produced in a simple manner by extrusion, for example.

As the repair and replacement of the bearer member is expediently envisaged from the outset, the holes of the socket are preferably reinforced by providing a thickening of the material in these regions. Also the thickened regions are preferably formed with flat bearing surfaces for supporting the head portions of the bolt fasteners. While the holes of the socket and replacement bearer are expediently present from the outset, it would also be possible to drill these holes during a subsequent repair at the workshop.

In a preferred embodiment of the invention, the insert is designed as an extruded light metal circular plate-like member having a central opening. The circumference of the insert is sized sufficiently large in diameter to ensure a positive and full surface contact with the inner cylindrical surface of the replacement bearer member. The insert further includes a longitudinal gap which extends from its outer peripheral edge to its central opening in order to compensate for tolerance discrepancies of the replacement bearer members. The plate-like insert has a thickness dimension sufficiently wide for containing a plurality of radially inward oriented threaded holes for receiving screw or bolt fasteners. Also, to provide sufficient strength, each hole of the insert is reinforced by thickened material regions which extend inwardly a distance towards the central opening of the insert.

In accordance with the method aspects of the invention, a damaged longitudinal bearer assembly is repaired as follows. First, the bearer joint is disassembled by cutting the weld seam which joins the first, forward longitudinal bearer member (which has been deformed as a result of a minor accident) to the socket. Next, the replacement front longitudinal bearer member is fitted with the plate-like insert at one end, with the threaded holes of the insert coaligned with the holes of the replacement bearer member. The replacement bearer member and insert combination is then fitted within the socket and is secured thereto by screw fasteners or threaded bolt connectors directed through the coaligned holes of the socket, bearer member and insert.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 is a schematic cross section view of a vehicle 1 which shows, in side elevation, the front region of the bearer structure of the vehicle body, designated generally at reference numeral 2. The bearer structure 2 includes a front longitudinal bearer assembly 3 which consists of a plurality of abutting end-to-end connected light metal structural members which include: a first or forwardmost front longitudinal bearer member 4; an adjacent second longitudinal bearer member 5; a side deviation 6 which extends from the rear end of bearer member 5 to the base of the front door pillar or front door post 8; and a bottom sill 9 which connects to the rearwardly disposed end of the side deviation 6.

The first longitudinal bearer member 4 and the second longitudinal bearer member 5 are joined together by a cast light metal connector 15. The connector 15 includes a bottom recess portion or socket 16 adapted for the fitted insertion of the rearward end of the first longitudinal bearer member 4. The connector 15 also is preferably formed with an attachment fitting along its upper surface for connection to the front suspension strut 10. The connector 15 preferably comprises a multipiece configuration, such as, for example two half shell portions which join the adjoining bearer ends in clam shell fashion. The entire strut 10 may be formed integral with one half shell portion of the connector 15.

The front suspension strut 10 supports a shock absorber 11 and is braced by another, substantially upright bearer member 12 which extends upwardly from the right or rear portion of the second longitudinal bearer member 5. The bearer member 13 connects the upright bearer 12 to the middle region 14 of the door post 8 to complete the front region of the bearer assembly 2.

FIG. 2 is an enlarged isometric view of the connector 15 and socket 16 shown with the first bearer member 4 inserted within the socket 16. In the preferred embodiment, the bearer member 4 is cylindrical in cross section and is sized for snug fit engagement within the corresponding socket 16 of the connector 15. Upon initial assembly at the factory, the first bearer member 4 is secured to the connector 15 by welding a surrounding weld seam 17 at the front edge of the socket 16. While this arrangement represents the preferred method of initial assembly of the bearer joint, it is understood that a firm connection may also be made by other conventional means, such as for example, screw or bolt fasteners. Even at this stage, however, a plurality of thickened material portions having flat contact surfaces 18 and holes 19 are provided in offsetting arrangement along the outer periphery of the socket 16.

With reference now to FIGS. 3-7 the method aspects of the invention will now be described. After an accident below a predetermined level of severity whereby only the first, front longitudinal bearer member undergoes deformation, the deformed bearer member is separated from the socket 16 by cutting the weld seam 17 after which it is removed. This results in the exposed socket 16 shown in FIGS. 5 and 7.

FIGS. 3-4 and 7 show a repair set which is used in carrying out the invention. The repair set comprises a replacement front longitudinal bearer member 4 which is provided with a plurality of holes 20 (only one hole is clearly visible) located along the periphery of one end of the bearer member 4 (see FIG. 3). The number and placement of holes 20 on the bearer member 4 correspond to the number and placement of holes 19 on the socket 16. While in the preferred embodiment shown, four holes are present in each component (socket 16 and bearer member 4), it is understood that as little as two holes may be provided or alternatively, a greater number of holes may be used depending on the space available.

The repair set also contains an insert 21 (FIGS. 4 and 7). The insert 21 is designed as a plate-like member having an outer cylindrical contact surface 22 and a central opening 23. To allow for tolerance variations of the inner cylindrical dimension of different replacement front bearer members, the insert is provided with a gap 24 which extends from the outer periphery or contact surface 22 to the central opening 23. A plurality of radially oriented threaded holes 26 are arranged offset along the circumference of the contact surface 22 in thickened material regions 25 of the insert 21.

In use, the insert 21 is fitted within the longitudinal bearer member 4 (FIGS. 3 and 7) such that the threaded holes 26 of the insert 21 are aligned with the holes 20 of the replacement bearer member 4. This arrangement is then inserted within the socket 16 and the coaligned holes 20, 26 are then brought into alignment with holes 19 of the socket 16.

Finally, the arrangement, consisting of the longitudinal bearer member 4, the insert 21 and the socket 16, is screwed together with the aid of a plurality of screw fasteners or threaded bolts 27, thereby providing a firm and positive bearer joint between the socket 16 and the bearer member 4.

The invention therefore provides a simple and economical design for an improved bearer joint and a method of repair wherein the original strength of the joint is not compromised during a replacement of a bearer member which was originally secured by a welded joint. The invention has particular utility in an aluminum bearer assembly where repair by thermal welding is problematic.

It should be understood that various modifications within the scope of this invention can be made by one of ordinary skill in the art without departing from the spirit thereof. For example, while the preferred embodiment of the invention has been described in detail with particular reference to the repair of a damaged front longitudinal bearer assembly, it is understood that the teaching principles of the invention may also be applied to other aluminum bearer assemblies of a vehicle bodywork which are subject to buckling along a common longitudinal axis. We therefore wish our invention to be defined by the scope of the appended claims as broadly as the prior art will permit, and in view of the specification if need be.

| PARTS LIST | |
|---|---|
| 1. Motor Vehicle | 23. Central Opening |
| 2. Vehicle Body | 24. Gap |
| 3. Longitudinal Bearer Assembly | 25. Thickened Regions |
| | 26. Threaded Holes |
| 4. Front Longitudinal Bearer Member | 27. Bolt |
| 5. Rear Longitudinal Bearer Member | |
| 6. Side Deviation | |
| 7. Foot | |
| 8. A-Pillar | |
| 9. Bottom Seal | |
| 10. Front Suspension Strut | |
| 11. Shock Absorber | |
| 12. Upright Bearer Member | |
| 13. Bearer Member | |
| 14. Middle Region | |
| 15. Connector | |
| 16. Cylindrical Socket | |
| 17. Weld Seam | |
| 18. Thickened Region | |
| 19. Hole | |
| 20. Hole | |
| 21. Insert | |
| 22. Cylindrical Contact Surface | |

We claim:

1. Method for replacing a bearer member in a motor vehicle body longitudinal bearer joint which includes a cast light metal connector having a tubular socket sized for receivingly engaging one end of a first, forwardly disposed extruded light metal longitudinal bearer member originally secured in place by a surrounding transverse weld seam joining said first bearer member to a front edge of said socket, said method comprising in operative sequence the steps of:

a) separating the weld seam;
b) removing the first bearer member;
c) providing said socket with a plurality of holes spaced apart along its circumference adjacent said front edge;
d) inserting into the socket a replacement bearer member kit assembly which includes:
   i) a replacement hollow-section bearer member having a first end provided with a plurality of holes spaced for coalignment with said holes of said socket;
   ii) an insert piece fitted within a hollow interior of said replacement bearer member first end and having a plurality of threaded holes spaced apart for coalignment with said holes of both said replacement bearer member first end and said socket;
e) aligning the respective holes of said socket and said replacement bearer member with the threaded holes of said insert piece; and
f) securing said replacement bearer member and insert piece to said socket with threaded bolt fasteners.

2. The method according to claim 1 wherein the first bearer member and the socket are manufactured from aluminum.

3. The method according to claim 2 wherein:
a) the first bearer member and the replacement bearer member are configured as elongated cylindrical members; and
b) the socket is circular in cross section and includes an inner diameter sized to conform to an outer diameter of the first bearer member and the replacement bearer member.

4. The method according to claim 3 wherein:
a) the socket includes thickened portions of material adjacent each hole thereof for reinforcement; and
b) each of the thickened portions of material includes a flat bearing surface for supporting a bolt head corresponding to one of the threaded bolt fasteners.

5. The method according to claim 4 wherein the insert piece is a nut plate and includes:
a) an outer perimeter surface configured for full contact with an inner surface of the replacement bearer member;
b) a central opening; and
c) a gap extending between said outer perimeter surface and said central opening to facilitate the fitted insertion of said nut plate within the hollow interior of replacement bearer members of varying inner tolerances.

6. The method according to claim 1 wherein:
a) the first bearer member and the replacement bearer member are configured as elongated cylindrical members; and
b) the socket is circular in cross section and includes an inner diameter sized to conform to an outer diameter of the first bearer member and the replacement bearer member.

7. The method according to claim 6 wherein:
a) the socket includes thickened portions of material adjacent each hole thereof for reinforcement; and
b) each of the thickened portions of material includes a flat bearing surface for supporting a bolt head corresponding to one of the threaded bolt fasteners.

8. The method according to claim 7 wherein the insert piece is a nut plate and includes:
a) an outer perimeter surface configured for full contact with an inner surface of the replacement bearer member;
b) a central opening; and
c) a gap extending between said outer perimeter surface and said central opening to facilitate the fitted insertion of said nut plate within the hollow interior of replacement bearer members of varying inner tolerances.

9. The method according to claim 4 wherein:
a) the socket includes thickened portions of material adjacent each hole thereof for reinforcement; and
b) each of the thickened portions of material includes a flat bearing surface for supporting a bolt head corresponding to one of the threaded bolt fasteners.

10. The method according to claim 9 wherein the insert piece is a nut plate and includes:
a) an outer perimeter surface configured for full contact with an inner surface of the replacement bearer member;
b) a central opening; and
c) a gap extending between said outer perimeter surface and said central opening to facilitate the fitted insertion of said nut plate within the hollow interior of replacement bearer members of varying inner tolerances.

11. The method according to claim 1 wherein the insert piece is a nut plate and includes:
a) an outer perimeter surface configured for full contact with an inner surface of the replacement bearer member;
b) a central opening; and
c) a gap extending between said outer perimeter surface and said central opening to facilitate the fitted insertion of said nut plate within the hollow interior of replacement bearer members of varying inner tolerances.

* * * * *